United States Patent [19]

Arora

[11] 4,086,002

[45] Apr. 25, 1978

[54] FIELD EFFECT LIGHT SHUTTER EMPLOYING LOW TEMPERATURE NEMATIC LIQUID CRYSTALS

[75] Inventor: Sardari L. Arora, Kent, Ohio

[73] Assignee: Haffmann-La Roche Inc., Nutley, N.J.

[21] Appl. No.: 417,501

[22] Filed: Nov. 20, 1973

Related U.S. Application Data

[63] Continuation-in-part of Ser. No. 223,310, Feb. 3, 1972, abandoned.

[51] Int. Cl.$^2$ .......................... C09K 3/34; G02F 1/13
[52] U.S. Cl. .................... 350/350; 252/299
[58] Field of Search .............. 252/408, 299; 350/160 LC

[56] References Cited

U.S. PATENT DOCUMENTS

| | | | |
|---|---|---|---|
| 3,795,436 | 3/1974 | Boller | 350/150 |
| 3,796,479 | 3/1974 | Helfrich | 350/150 |
| 3,815,972 | 6/1974 | Hsieh | 350/160 LC |
| 3,876,286 | 4/1975 | Deutscher et al. | 252/299 |
| 3,881,806 | 5/1975 | Suzuki | 252/299 |
| 3,915,883 | 10/1975 | Vanmeter et al. | 252/299 |
| 3,919,105 | 11/1975 | Katagiri et al. | 252/299 |
| 3,923,857 | 12/1975 | Boller et al. | 252/160 LC |
| 3,960,749 | 6/1976 | Fergason | 252/299 |
| 3,960,752 | 6/1976 | Klanderman et al. | 252/299 |
| 3,963,313 | 6/1976 | Boller et al. | 350/299 |
| 3,975,286 | 8/1976 | Oh | 252/299 |
| 4,001,137 | 1/1977 | Steinstrasser | 252/299 |
| 4,011,173 | 3/1977 | Steinstrasser | 252/299 |
| 4,020,002 | 4/1977 | Oh | 252/299 |

FOREIGN PATENT DOCUMENTS

| | | | |
|---|---|---|---|
| 2,024,269 | 12/1971 | Germany | 252/299 |
| 2,123,175 | 12/1971 | Germany | 252/299 |
| 2,139,628 | 2/1973 | Germany | 252/299 |
| 2,261,548 | 6/1973 | Germany | 252/299 |
| 2,321,632 | 11/1974 | Germany | 252/299 |
| 4,934,488 | 3/1974 | Japan | 252/299 |
| 4,988,791 | 8/1974 | Japan | 252/299 |

*Primary Examiner*—Richard E. Schafer
*Assistant Examiner*—T. S. Cron
*Attorney, Agent, or Firm*—Samuel L. Welt; Bernard S. Leon; Raymond R. Wittekind

[57] ABSTRACT

A field effect liquid crystal light shutter employing low temperature nematic liquid crystals of the p-alkylphenyl-p'-akyl and alkoxy benzoate series.

4 Claims, No Drawings

FIELD EFFECT LIGHT SHUTTER EMPLOYING LOW TEMPERATURE NEMATIC LIQUID CRYSTALS

CROSS-REFERENCES TO RELATED APPLICATIONS

This application is a continuation-in-part of copending application Ser. No. 223,310, filed Feb. 3, 1972, now abandoned.

BACKGROUND OF THE INVENTION

Many available room temperature nematic liquid crystal materials or mixtures of these invariably belong to the substituted benzylidene aniline series as disclosed in, for example, U.S. Pat. Nos. 3,499,702 and 3,597,044. One of the major problems with anil materials is their instability to cleavage or reaction of the imine linkage. Many investigators have reported difficulties in the reproducibility of the transition of the materials by their temperature and electrooptic properties while using these materials. The nonreproducible data obtained is due, it is thought, to the generation of impurities as a result of the side reactions and decomposition of the unstable anil linkage. The other major disadvantage with the imine derivatives (Schiff bases) is their pale yellow to yellow color and this color is imparted to the electro-optic cells prepared by the use of the liquid crystals for display use and other purposes. Presence of any yellow color considerably decreases the contrast ratio of the electro-optic cells.

SUMMARY OF THE INVENTION

In accordance with the present invention, a field effect liquid crystal light shutter is provided employing a liquid crystal material which is colorless, of positive dielectric anisotropy and at the same time is nematic at room temperature.

The liquid crystal material is comprised of a mixture of at least three different liquid crystal compounds having the general formula:

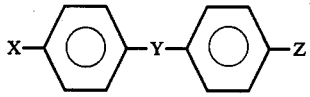

In two of the three compounds, the Y radical comprises an ester linkage

while the X and Z radicals comprise a saturated alkyl group or an alkoxy group having a chain of 1 to 18 carbon atoms. The third compound, which imparts positive dielectric anisotropy to the mixture, is preferably an ester also, but may in certain cases comprise an aniline. In either case, it consists of a cyano compound which imparts positive dielectric anisotropy and is present in the mixture of the three compounds in the range of about 3 to 40 weight percent and preferably 10 weight percent of the total mixture of the three compounds. Thus, in the third compound, the Y radical can be either

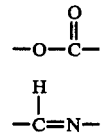

the X radical comprises N≡C—; and the Z radical comprises an alkoxy or saturated alkyl chain containing 1 to 18 carbon atoms.

The use of materials having an ester linkage in the molecular structure instead of an imine eliminates atmospheric decomposition or other complex polymerization and various side reactions. Therefore, difficulties encountered with anils in regard to non-reproducible behavior are eliminated; and the inert property of the ester materials makes them very stable. At the same time, the ester materials are colorless, meaning that they give a considerably higher contrast ratio when used in liquid crystal displays and the like. Mixtures of these novel materials have a considerable range within which they exhibit a nematic phase such as, for example, about $-28°$ C to $+44°$ C. Thus, they are well suited for making various devices which can be operated at both normal and subnormal temperatures.

DESCRIPTION OF THE PREFERRED EMBODIMENTS

In general, the compounds of the invention can be prepared by first making the acid chloride of an appropriate p-alkyl or p-alkoxy-benzoic acid dissolved in dry toluene by reaction with thionyl chloride in the presence of pyridine. The reaction mixture, after refluxing, is filtered to remove pyridine hydrochloride and the filtrate distilled under reduced pressure to remove the solvent and the unreacted thionyl chloride. The residual acid chloride dissolved in dry toluene is then reacted with an appropriate p-substituted phenol in the presence of pyridine and refluxed. After the reflux, pyridine hydrochloride is filtered and the solvent from the filtrate is stripped off under reduced pressure. The residual mass is brought to room temperature and dissolved in methanol, which on cooling at low temperatures obtained with liquid nitrogen or another suitable coolant, gives a white crystalline material. The solid is filtered and recrystallized from petroleum ether or n-hexane. Recrystallizations are continued until the transition temperatures remain constant.

The following is a specific example of the manner in which the compounds of the invention and mixtures thereof may be prepared:

EXAMPLE

1. PREPARATION OF PPPOB

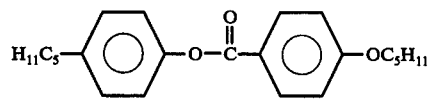

1.25 mol of p-pentyloxybenzoyl chloride are dissolved in about 500 ml. of dry toluene to which about 60 ml. of pyridine has also been added. To this, while it is being refluxed, 1 mol of p-pentylphenol dissolved in about 700 ml. of dry toluene, is added slowly.

After the addition, the mixture is refluxed overnight, it is then cooled, filtered, and the filtrate is stripped off to remove toluene. The residual liquid is dissolved in benzene and is transferred to a separatory funnel where it is washed several times with a 3.5% w/v hydrochloric acid solution, followed by a number of washings with 5% w/v sodium hydroxide solution. It is finally washed with deionized water until the aqueous washings are neutral to the litmus paper. The washed solution is dried over anhydrous sodium sulfate followed by filtration and subsequent removal of the solvent from the filtrate. The residual mass is recrystallized from methanol with subsequent recrystallizations from the mixed solvent of petroleum ether and methanol until the transition temperature remains constant.

2. Preparation of PPMeOB

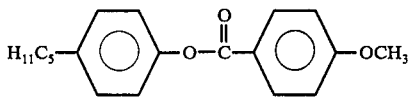

It is similarly prepared as PPOB. The ratio of the various starting components is as follows:
(a) p-methoxybenzoyl chloride 1.1 mol
(b) p-pentylphenol 1 mol
(c) Dry toluene 1300 ml.
(d) Pyridine 110 ml.

3. Preparation of CNPOOB

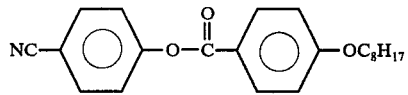

It is also identically prepared as PPPOB. The ratio of the components is as follows:
(a) p-octyloxybenzoyl chloride 1 mol
(b) p-cyanophenol 1 mol
(c) Dry toluene 1250 ml.
(d) Pyridine 87 ml.

The mixture of the invention is prepared by mixing 53.57 parts by weight of PPMeOB, with 35.72 parts of PPPOB and 10.71 parts of CNPOOB, by weight.

The mixture is heated at low temperatures until a clear liquid is obtained. It is then cooled and 0.021 part by weight of cholesteryl chloride is added. The mixture is again heated similarly until it is cleared.

After cooling, it is kept over 5A molecular sieves overnight (stored in vacuum desiccator) and is finally transferred to a column packed with 5A molecular sieves. It is removed in installments from the column with subsequent filtration from a millipore unit. The liquid crystal material thus obtained, is ready to be used for making display units.

p-alkylphenyl-p'-alkyl and alkoxybenzoates are given in the following Table I together with their nematic and isotropic transition temperatures; while mixtures of compounds of Table I with the addition of the cyano compound which imparts positive dielectric anisotropy are given in Table II together with their transition temperatures.

Table I

| S. No. | Substituents X | Substituents Z | Transition temperatures, °C, from solid or preceding liquid crystals state to: Nematic | Transition temperatures, °C, from solid or preceding liquid crystals state to: Isotropic |
| --- | --- | --- | --- | --- |
| 1 | n-H$_7$C$_3$ | H$_3$CO | — | 48.0 |
| 2 | " | H$_5$C$_2$O | — | 37.6$^a$ / 79.7 |
| 3 | " | n-H$_7$C$_3$O | — | 61.3$^a$ / 73.5 |
| 4 | " | n-H$_9$C$_4$O | — | 42.7$^a$ / 71.7 |
| 5 | " | n-H$_{11}$C$_5$O | 42.1 | 56.7$^a$ / 48.8 |
| 6 | " | n-H$_{13}$C$_6$O | 54.7 | 57.9 |
| 7 | " | n-H$_{15}$C$_7$O | — | 65.9 |
| 8 | " | n-H$_{17}$C$_8$O | 59.0 / 47.0$^b$ | 56.6$^a$ / 63.0 |
| 9 | n-H$_9$C$_4$ | H$_3$C | — | 35.2 |
| 10 | " | H$_3$CO | — | 40.0 |
| 11 | " | H$_5$C$_2$O | — | 92.2 |
| 12 | n-H$_{11}$C$_5$ | H$_3$C | — | 53.8$^a$ / 35.8 |
| 13 | " | H$_3$CO | 27.0 | 40.1 |
| 14 | " | H$_5$C$_2$O | — | 72.8 |
| 15 | " | n-H$_9$C$_4$O | — | 62.5$^a$ / 66.1 |
| 16 | " | n-H$_{11}$C$_5$O | 39.0 | 58.0$^a$ / 54.0 |

$^a$Transition from monotropic nematic.
$^b$Transition from monotropic smectic C.

TABLE II

Mixtures of Some Compounds of Table I with Materials A or B, Identified at the Footnote of this.

| Mixture No. | Wt. Percent of Compound No. and with A or B 2 | 9 | 13 | 14 | 16 | A* | B+ | C$^a$-N$^b$ or F$^c$-N 0° C | N-I$^d$ °C |
| --- | --- | --- | --- | --- | --- | --- | --- | --- | --- |
| 1 | 14.5 | — | — | — | 76.4 | 9.1 | — | 29.0 | 55.4 |
| 2 | 14.5 | — | — | — | 76.4 | — | 9.1 | 26.0 | 58.8 |
| 3 | — | 13.6 | — | — | 77.3 | 9.1 | — | 5.0 | 37.6 |
| 4 | — | 13.6 | — | — | 77.3 | — | 9.1 | 4.0 | 42.0 |
| 5 | — | — | 72.7 | — | 18.2 | 9.1 | — | −28.0 | 44.0 |
| 6 | — | — | 72.7 | — | 18.2 | — | 9.1 | −22.0 | 50.1 |
| 7 | — | — | — | 12.7 | 78.2 | 9.1 | — | 19.0 | 55.7 |
| 8 | — | — | — | 12.7 | 78.2 | — | 9.1 | 18.0 | 60.8 |
| 9 | — | 17.3 | — | 5.5 | 68.2 | 9.0 | — | 7.0 | 44.7 |
| 10 | — | 17.3 | — | 5.5 | 68.2 | — | 9.0 | 6.0 | 48.7 |

Material:-A* is p-cyanobenzylidene-p'-butylaniline (CNBBA) having the following structural formula -

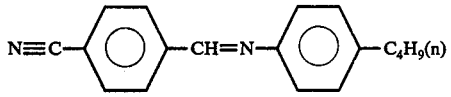

:-B+ is p:cyanophenyl-p'-octyloxybenzoate (CNPOOB) and has the undermentioned structural formula -

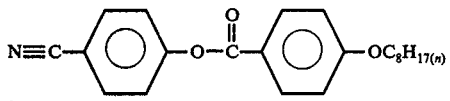

$^a$crystal;
$^b$nematic liquid;
$^c$freezing and
$^d$isotropic liquid.

It is obvious, to one skilled in the art, that the proportions in which CNPOOB or CNBBA is mixed can be adjusted suitably to have other mixtures of the compounds of the invention with similar properties. As mentioned above, the cyano compound may be present in the range of about 3 to 40 weight percent. Any other suitable material may be used in lieu of CNBBA or CNPOOB to obtain the positive dielectric anisotropy for the nematic liquid crystal material. Typical substitutes and their transition temperatures are given in the following Table III wherein various alkyl or alkoxy groups are used for the "X" radical.

TABLE III p-cyanophenyl-p'-alkoxy and alkylbenzoates

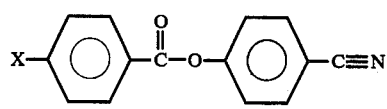

| S. No. | Substituents X | Transition temperatures, ° C, from solid or preceding liquid crystal state to: | |
| --- | --- | --- | --- |
| | | Nematic | Isotropic |
| 1 | H$_3$CO— | — | 109.0 |
| | | | 95.7+ |
| 2 | H$_5$C$_2$O— | — | 116.0 |
| | | 106.2+ | |
| 3 | n-H$_{11}$C$_5$O— | — | 86.0 |
| | | | 77.3+ |
| 4 | n-H$_{17}$C$_8$O— | 74.0 | 84.0 |
| 5 | H$_3$C— | — | 144.0 |

+Transition from monotropic nemtaic

It is interesting to note that even where the benzoates of the invention do not by themselves form a nematic liquid crystal, when mixed with other benzoates of the invention, a nematic liquid crystal phase of the mixture is obtained. Note mixtures 3 and 4 in Table II as one example of this unusual characteristic of the p-butylphenyl-p'-methylbenzoate when mixed with the No. 16 compound and compound A or B.

When making mixtures of different ones of the esters as listed in Table I, one would select the temperature range for the material, and the percentage of such material used, so as to most probably obtain the desired temperature range for the nematic liquid crystal phase for any particular intended use of the liquid crystal system. Likewise, when preparing a liquid crystal system with substantially neutral or positive dielectric anisotropy, again the basic mixture composition of Table II, for example, can be varied appreciably.

While several complete embodiments of the invention have been disclosed herein, it will be appreciated that modification of these particular embodiments may be resorted to without departing from the spirit and scope of the invention.

I claim as my invention:

1. In a field effect liquid cyrstal display of the type in which a layer of liquid crystal material of positive dielectric anisotropy is sandwiched between transparent conductive electrodes; the improvement wherein said liquid crystal material comprises a mixture of at least three different liquid crystal compounds wherein in at least the first two of said compounds have the general formula:

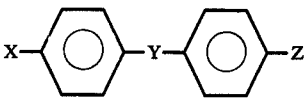

wherein the radical Y comprises an ester linkage

and the X and Z radicals are selected from the group consisting of a saturated alkyl group having 1 to 18 carbon atoms and an alkoxy group having 1 to 18 carbon atoms, and the third of said compounds

has the general formula:

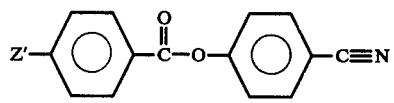

wherein the radical Z' is selected from the group consisting of methyl and an alkoxy group having 1 to 18 carbon atoms and wherein the third of said compounds is present in the range of about 3 to 40 weight percent.

2. The improvement of claim 1 wherein the third of said compounds is present in said mixture in the amount of about 10 weight percent.

3. The improvement of claim 1 wherein the radical X comprises a saturated alkyl radical and the radical Z comprises an alkoxy radical.

4. The improvement of claim 1 wherein one of said compounds comprises:

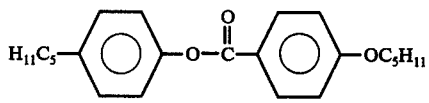

a second of said compounds comprises:

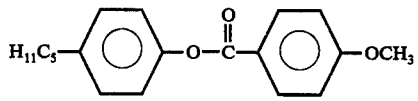

and the third of said compounds comprises:

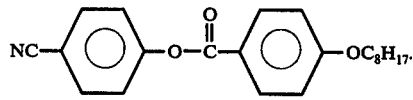

* * * * *